US008705985B2

United States Patent
Christensen

(10) Patent No.: US 8,705,985 B2
(45) Date of Patent: Apr. 22, 2014

(54) FAST OPTICAL RECEIVER FOR UNENCODED DATA

(75) Inventor: Steen Bak Christensen, Roskilde (DK)

(73) Assignee: Mellanox Technologies Denmark APS, Roskilde (DK)

( * ) Notice: Subject to any disclaimer, the term of this patent is extended or adjusted under 35 U.S.C. 154(b) by 422 days.

(21) Appl. No.: 13/152,053

(22) Filed: Jun. 2, 2011

(65) Prior Publication Data

US 2012/0027400 A1 Feb. 2, 2012

Related U.S. Application Data

(60) Provisional application No. 61/350,569, filed on Jun. 2, 2010.

(30) Foreign Application Priority Data

Oct. 11, 2010 (DK) ................................. 2010 00923

(51) Int. Cl.
*H04B 10/06* (2011.01)

(52) U.S. Cl.
USPC ............................. 398/206; 398/209; 398/213

(58) Field of Classification Search
USPC .................................................. 398/202–214
See application file for complete search history.

(56) References Cited

U.S. PATENT DOCUMENTS

| 5,430,766 A | 7/1995 | Ota et al. |
| 5,822,104 A * | 10/1998 | Saito ............................. 398/202 |
| 6,359,715 B1 | 3/2002 | Imajo |
| 6,907,202 B1 | 6/2005 | Ide et al. |
| 7,369,781 B2 | 5/2008 | Seo et al. |
| 2003/0189997 A1 * | 10/2003 | Shanbhag et al. ............ 375/348 |
| 2004/0190913 A1 * | 9/2004 | Seo et al. ....................... 398/202 |
| 2006/0051017 A1 * | 3/2006 | Hallemeier et al. ............ 385/28 |
| 2008/0042735 A1 * | 2/2008 | Ide ................................. 327/538 |
| 2009/0022502 A1 | 1/2009 | Tsunoda |

FOREIGN PATENT DOCUMENTS

| EP | 0 909 046 A2 | 4/1999 |
| EP | 0 964 539 A2 | 12/1999 |

OTHER PUBLICATIONS

International-Type Search Report (PCT/ISA/201A) for DK 201000923 dated Jun. 9, 2011.
Danish Search Report for PA 201000923 dated Jun. 7, 2011.

* cited by examiner

*Primary Examiner* — Dzung Tran

(74) *Attorney, Agent, or Firm* — Buchanan Ingersoll & Rooney PC

(57) ABSTRACT

A method and an optical receiver implementing this method suitable for robustly receiving unencoded optical data. The method sets the threshold for the receiver using values relating to the high and low values of a binary signal. However, for some data patterns these values may not be accurately determined, such as for extended periods of constant high or low values being transmitted. In this case the method, in one embodiment, assumes that the extinction ratio of the signal is substantially constant and is thereby able to track the threshold for the signal.

40 Claims, 7 Drawing Sheets

FAST OPTICAL RECEIVER FOR UNENCODED DATA

TECHNICAL FIELD

Figure 1:
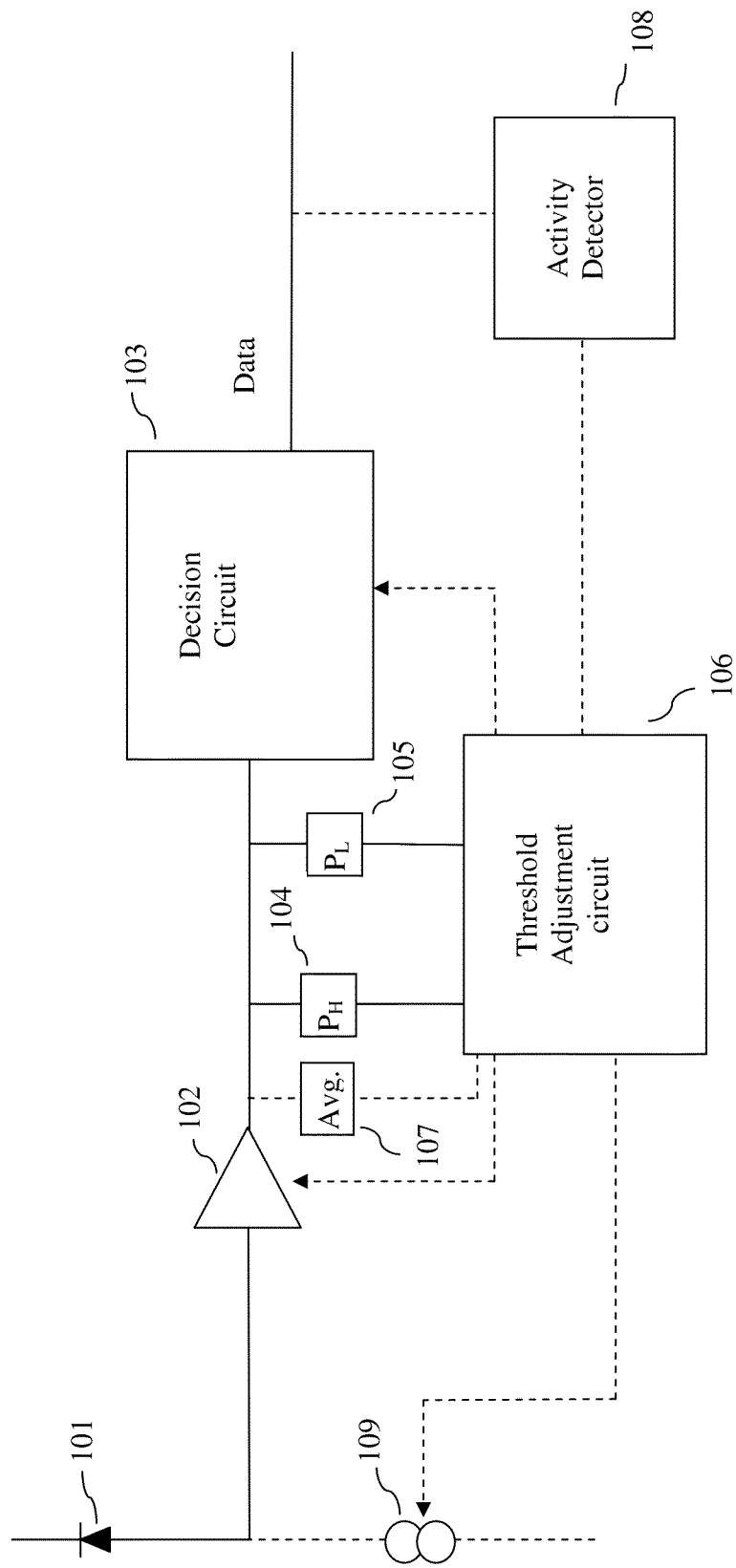

The invention relates to a method and circuit for a fast optical receiver suitable for receiving unencoded data for example in an optical interconnect.

BACKGROUND ART

A requirement for conventional binary data transmission is the establishment of a well-defined logic threshold. Metallic wired systems use pre-defined dc logic levels for this purpose. This is unsatisfactory in an optical system where absolute signal levels are commonly not known a priori. The conventional solution is ac-coupling between the receiver and the logic quantizer. With this approach, dc logic threshold levels are established by forming a "signal average" of the received data pulse. Signals above the average are considered as logic ONEs, while signals below the average are logic ZEROs. While ac-coupled receivers may work well for encoded continuous data transmission they do not work well for burst mode data transmissions and signals where the time average of the signal may vary.

A well known problem in the art of digital optical communication is the difficulty in using unencoded data, i.e. a direct unencoded transmission of data. Here the data to be transmitted is allowed to have long strings of only ONEs or only ZEROs also referred to as long CIDs (Consecutive Identical Digits) and/or the data is not necessarily DC balanced (i.e. having on average substantially equal amounts of the high logic and low logic values). This is because, for proper operation of an AC coupled receiver, the optimal threshold is usually substantially midway between the logic high and logic low value and should substantially correspond to the average (for brevity "logic high" and "logic low" may be referred to as simply high and low values). Therefore non-transition periods, i.e. a period of long CIDs should be small relative to the time constant determined by the capacitance for coupling between a) a preamplifier of an electrically-converted version of the optical signal and b) a comparator which is used to determine the logic value, i.e., 1 or 0, of the incoming optical signal. In optical links this problem is commonly solved by using encoding of the signal prior to transmission and decoding after reception. The encoding ensures that transition occurs in the optical data signal even if the data is a long string of CIDs. Furthermore, the encoding often ensures that the optical signal is balanced. Disadvantageously, doing so mandates that a decoder be present in the receiving system to remove the formatting and reconstruct the original data. Also, data transmission efficiency is commonly degraded because of the required extra bits for the encoding.

While AC coupling is not always needed in electrical communication systems, it was believed to be required in optical systems, because there is no common electrical connection between the transmitter and the receiver. Nevertheless, eventually some of the above-noted disadvantages were overcome by burst-mode digital optical receivers which use direct current (DC) coupling. Such a DC coupled burst-mode digital optical receivers are disclosed in U.S. Pat. No. 5,025,456 which was intended to adapt to the amplitude of the incoming burst data packet and automatically adjust the logic threshold voltage to the dc center, ideally during the first bit of the input data burst. The inventors later characterized the purpose of this invention as meeting the challenge of having several transmitters on the same optical bus where the power levels may vary dramatically between transmitters, see U.S. Pat. No. 5,430,766. This later patent aimed at solving the problem of having a relatively high amount of constant light from each transmitter combined reaching the receiver. The same inventors also patented a burst mode receiver in U.S. Pat. No. 5,371,763. The above cited patents are incorporated herein by reference.

However, one drawback of these prior arts burst-mode receivers is that they rely on the use of a preamble preceding the payload data in a data burst to set the logic threshold. Such a preamble will often comprise a data sequence aimed at initializing the receiver rather than carry data. Such receivers are therefore often not suitable for receiving unencoded data because correct determination of the first digits after a long CID may not be ensured at least not with good pulse width distortion.

DISCLOSURE OF INVENTION

The inventor has realized that unlike prior art receivers suitable for integration into optical networks where multiple receivers transmit to the same receiver, the receiver is in many optical interconnects paired with a single transmitter (i.e. light source and light source driver).

Today, optical interconnects or optical cables appear to be increasingly important means for transportation of digital information. These links are commonly expected to enable high transfer speed of e.g. 10 Gbit/s or higher. To facilitate simple integration into the system it would often be an advantage to enable the link to robustly carry an unencoded data stream without the use of preambles that would otherwise allow the link to set a suitable threshold before any payload data is received. The link should be able to tolerate long durations of no data and at the same time preferably correctly interpret the first bit received after e.g. several days of no data. During such a time drifting in the transmitter caused by e.g. temperature and/or aging of the laser may occur or the optical loss from transmitter to receiver may change. Compared to many prior art systems the challenge of providing a suitable logic threshold (here also referred to as just "threshold" for brevity) for the first bit has increased due to the higher transfer speed. There is therefore a need for an optical receiver which is capable of robustly receiving unencoded high speed data.

At the same time the inventor has discovered that while laser diodes, in particular VCSELs, tend to drift in functionality due to temperature and/or aging it is possible via prior art methods to construct the driver to compensate for this to an extent so that at least most of the time the extinction ratio in a binary signal is substantially constant or only varies slightly such as for example 0.5 dB. Variations in the magnitude of the received signal may for example arise from changes in the optical loss from transmitter to receiver, such as via a mechanical movement of an optical fiber. In one embodiment the invention therefore relates to a method for setting a logic threshold in an optical receiver suitable for detecting a binary optical data signal, said method comprising
  a. converting said binary optical data signal, via a photo detector, to a binary electrical signal proportional to said binary optical data,
  b. at a previous time said binary electrical signal comprising a previous logic high and logic low value in response to said optical signal, said previous logic high value and previous logic low value having a previous extinction ratio,
  c. setting a previous logic threshold suitable for distinguishing logic values in said binary electrical signal or a derivatives thereof, d. at a later present time said binary electrical signal comprising at least one of a present logic high and logic low value in response to said optical signal, said present high value and present low values having a present extinction ratio, e. measuring at least one of
   i. a previous $P_H$ value and a present $P_H$ value related to said previous and present high value, respectively, and
   ii. a previous $P_L$ value and a present $P_L$ value related to said previous and present low value, respectively, wherein said method further comprises updating said previous threshold to a present threshold based on at least one of said measured previous and present $P_H$ and $P_L$ values and that the previous and present extinction ratios are substantially equal. In this way the receiver may be able to set a valid threshold even in the event of e.g. a long series of CIDs where only high or a low value is present. Here it is noteworthy that the binary electrical and optical signal has a defined extinction ratio even if it only one logic low value is observable e.g. during a long series of CIDs. In that case the other logic value is the value which would be exhibited in the event of a transition. Hence, the present logic low value exits per definition even if only the logic high value is observable and vice versa. Note also that strictly speaking the common use of the term "extinction ratio" relates to optical signals. However, as the binary electrical signal is substantially proportional to the optical binary signal, the same term is applied to this signal in the present context.

Note also that the photo detector may provide an electrical signal (commonly a current) as a sum of the binary electrical signal, which is proportional to said optical data signal, and other signals. The latter typically includes noise from the photo detector sometimes referred to as dark current from the photo detector.

By way of the invention the receiver may utilize the assumption that the extinction ratio is substantially constant when the measurement of either peak values $P_H$ or $P_L$ is deemed invalid i.e. the obtained value is likely not to reflect the actual logic value. A further discussion of this validation is provided later in this text. By utilizing the stability of the extinction ratio the receiver of the invention is able to determine a viable threshold value even during long periods of time dominated by ONEs or ZEROs or where only ONEs or ZEROs are received. In one embodiment the receiver is therefore able to interpret the first bit correctly after such a period even at high data rate. Hence, the invention will enable optical receivers for unencoded data at high data rates with reduced or no constraints on minimal bandwidth of the signal.

In one embodiment this invention may find application for links using burst mode transmission where a payload of data is preceded by a pre-ample. The invention may for example provide the receiver with an improved initial value for the threshold improving an initialization of the receiver based on the preamble.

In one embodiment the invention relates to an optical receiver for receiving a binary optical data signal comprising
   a. a photo detector arranged to produce an electrical signal in response to said optical signal, said electrical signal having a high value and a low value,
   wherein the receiver further comprises circuitry for implementing the method described above.

Similarly, the invention relates to embodiments of an optical receiver each implementing one of the embodiments of the method according to the invention discussed below.

For example, in one embodiment the receiver further comprises an averaging circuit suitable for providing a parameter AVG, such as to a Threshold Adjustment Circuit (TAC), related to the average value of the binary electrical signal. In one embodiment this allows the TAC to use the average of the optical signal to determine the validity of the values $P_H$ and $P_L$. This validation will be discussed in more detail with regard to the method of the invention. Furthermore, in one embodiment the receiver further includes an activity detector which may contribute to the validation of $P_H$ and $P_L$. In one embodiment this receiver is part of a transceiver i.e. also comprising circuitry and light source for transmitting a signal.

In one embodiment the invention relates to the receiver circuit of the receiver and in one embodiment the invention relates to a receiver chip suitable for implementing the method of the invention into an optical receiver. In one such embodiment the invention relates to an optical receiver chip implementing the method of the invention into an optical receiver, comprising
   a. a connector suitable for connecting a photo detector and receiving from the photo detector a binary electrical signal having a logic high and logic low value,
   b. at least one peak detector arranged to measure at least one of a $P_H$ value related to said high value and a $P_L$ value related to said low value,
   c. at least one further circuit for characterizing the received signal allowing assessment of the validity of measured values of said at least one of $P_H$ and $P_L$.

Said further circuit may for example comprise one or more of an activity detector, an average detector, one or more peak detectors having a different bandwidth relative the at least one peak detector and any circuitry for implementing the method of the invention according to one or more of the embodiments described below.

In one embodiment updating said threshold to a present threshold based on that the previous and present extinction ratios are substantially equal comprises applying at least one previous extinction ration parameter (E). In principle this E parameter may be any suitable parameter which depends on and/or provides information of the extinction ratio. For example the logic high value depends on E in so far as it is equal to E times the logic low value; therefore, the logic high may in one embodiment be viewed as an extinction ratio parameter E. Similarly the threshold is often set as the average of the logic high and low values and by the same relation between logic high and low be said to constitute an extinction ratio parameter. Examples of the extinction ratio parameter E comprise parameters proportional and/or offset from a parameter selected from the group of: the previous logic threshold, said previous $P_H$, the previous $P_L$, the ratio of said previous $P_H$ to the previous $P_L$ i.e. $P_H/P_L$ or a combination thereof.

In the context of this text the phrase a value "related to" another value or parameter infers a functional relationship between two parameters. In one embodiment "relates to" indicates the possibility of a scaling and/or offset which may be suitable in one implementation of the invention. For example, in one embodiment a value may be determined as a voltage whereas the other is a current or vice versa. For example, the voltage obtained from the current through a resistor, where an offset may be caused by another current flowing through the resistor and/or caused by that the voltage across the resistor refers to a potential other than ground e.g. the positive supply. In one such embodiment the two values may therefore differ by a proportionality factor. An inversion of the electrical binary signal so that logic high value is lower than the logic low value at the input of the measurement of $P_H$ and $P_L$ corresponds to a negative proportionality factor. The occurrence of an offset between the binary electrical signal and input to the measurement of $P_H$ and $P_L$ is further discussed below. However, it is noted that the assumption of substantially constant extinction ratio relates to the extinction ratio of the binary optical signal hence also to the extinction ratio of the binary electrical signal as the two are proportional. It is noted the extinction ratio is unaffected by a scaling of the $P_H$ and $P_L$ relative to the high and low values of the optical signal but not so by an offset i.e. a shift by an added constant. Hence $P_H$ and/or $P_L$ is in one embodiment compensated for an offset relative to the binary electrical signal before applied in determining the threshold, such as being applied in an Extinction ratio parameter E. More generally, it is also within the scope of the invention to perform any other compensation for a transformation of the binary electrical signal to the input to the measurement of $P_H$ and $P_L$, or for a transformation of the binary optical signal to the input to the measurement of $P_H$ and $P_L$. In one embodiment this means that the measured values of $P_H$ and/or $P_L$ are replaced by the corresponding value of the electrical binary signal or the intensity in the binary optical signal corresponding to that value. In other words, the value of the binary electrical signal or optical binary signal which gives rise to the corresponding value of $P_H$ and/or $P_L$ at the note at which they are measured e.g. by a peak detector. Other variables such as average and threshold should be replaced by their corresponding value as well.

In one embodiment the photo detector is not a linear device and the binary electrical signal is therefore not proportional to the optical signal. In one such embodiment $P_H$ and $P_L$ are replaced by the corresponding value of the binary optical signal. In one such embodiment the binary electrical signal is understood in the embodiments described herein to be the electrical signal that would have occurred had the photo detector been linear.

In one embodiment "a value related to" a second value is taken to mean substantially equal to or in one embodiment equal to.

It is envisioned that the receiver, in one embodiment, measures the values $P_H$, $P_L$ and/or E either continuously or at regular intervals during operation of the receiver. The prefix "present" indicates that this value may be applied as an indicator of the signal presently being received. In one embodiment the present value cannot be formed and/or read instantaneously and therefore the present value may strictly speaking be an indicator of the signal that was recently received. In one embodiment the present $P_H$ and $P_L$ values are the latest measured value. The prefix "previous" indicates that the values were values measured previously. In one embodiment the previous parameters previous $P_L$, previous $P_H$, and said at least one previous extinction ratio parameter(s) E correspond to the value at different times, i.e. the prefix "previous" does not necessarily indicate that all previous values are obtained at the same previous time. For example the extinction ratio parameter(s) E may in one embodiment be established at the start-up of the link and assumed constant through the operation of the link or in one embodiment only change under specific conditions. In another example the receiver maintains a constant value equal to the previous value as long as the present value is found to be invalid. In one embodiment the receiver updates the threshold with a given frequency and the present value therefore refers to the value of the present cycle and the previous value of a previous cycle. In one embodiment this frequency is less than or equal to 1 GHz, such as less than or equal to about 100 MHz, such as less than or equal to about 10 MHz, such as less than or equal to about 1 MHz, such as less than or equal to about 500 kHz, such as less than or equal to about 100 kHz, such as less than or equal to about 10 kHz, such as less than or equal to about 1 kHz, such as less than or equal to about 500 Hz, such as less than or equal to about 100 Hz, such as less than or equal to about 10 Hz, such as less than or equal to about 1 Hz. In one embodiment this frequency is more than or equal to 1 Hz, such as more than or equal to 10 Hz, such as more than or equal to 100 Hz, such as more than or equal to 500 Hz, such as more than or equal to 1 kHz, such as more than or equal to 10 kHz, such as more than or equal to 100 kHz, such as more than or equal to 500 kHz, such as more than or equal to 1 MHz, such as more than or equal to 10 MHz, such as more than or equal to 100 MHz, such as more than or equal to 1 GHz.

In the context of the present text all values of the optical signal or electrical signal (or their derivatives) may in one embodiment have a previous and a present value. Generally, when reference is given to "a value" without specification of previous or present, this part of the discussion relates to both previous and present values.

In one embodiment the time span between a previous value and the present value may be longer than 1 bit (with a duration set by the bit rate BR), such as equal to 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more, such as equal to 5 minutes or more, such as equal to 15 minutes or more, such as equal to 30 minutes or more, such as equal to 45 minutes or more, such as equal to 1 hour or more, such as equal to 5 hours or more, such as equal to 10 hours or more, such as equal to 15 hours or more, such as equal to 20 hours or more, such as equal to 1 day or more, such as equal to 2 days or more, such as equal to 10 days or more. In one embodiment the time span is equal to 10 days or shorter, such as 2 days or shorter, such as 1 day or shorter, such as 10 hours or shorter, such as equal to 1 hour or shorter, such as equal to 1 minute or shorter, such as equal to 1 second or shorter, such as equal to $10^4$ bits or shorter, such as equal to $10^3$ bits or shorter, such as equal to $10^2$ bits or shorter, such as equal to 10 bits or shorter, such as equal to 5 bits or shorter, such as equal to 4 bits or shorter, such as equal to 3 bits or shorter, such as equal to 2 bits or shorter, such as equal to 1 bit or shorter.

In one embodiment the invention relates to a method for setting a threshold in an optical receiver comprising a threshold adjustment circuit (TAC), said method comprising
  a. converting a binary optical data signal to a binary electrical signal proportional to said optical data signal via a photo detector, said electrical signal having a present high value and a present low value forming a present extinction ratio, and a previous high value and a previous low value and a previous extinction ratio,
  b. obtaining a previous $P_H$ value and a present $P_H$ value related to said previous and present high value, respectively,
  c. obtaining a previous $P_L$ value and a present $P_L$ value related to said previous and present low value, respectively,
  d. forming at least one previous extinction ratio parameter E,
  e. validating said present $P_H$ and present $P_L$ and
  f. in the event that one of values of said present $P_H$ and present $P_L$ is deemed invalid; setting a threshold via said TAC for said binary electrical signal based on the other value and said at least one previous extinction ratio parameter(s) E.

In other words, in the event that said present $P_H$ is deemed invalid; setting a threshold via said TAC for said binary electrical signal based on the $P_L$ and said at least one previous extinction ratio parameter(s) E. In the event that present $P_L$ is deemed invalid; setting a threshold for said binary based on $P_H$ and said at least one previous extinction ratio parameter(s) E.

DETAILS OF THE INVENTION

In one embodiment threshold is set to a value based in the present $P_H$ and present $P_L$ when both present $P_H$ and present $P_L$ are deemed valid. In one embodiment this has the advantage that the time span in which the extinction ratio is assumed constant may be shorter which in turn may improve accuracy in setting the threshold. In one embodiment the threshold is set as a value related to the center value between the present $P_H$ and present $P_L$. In one embodiment the transmitter may (as an example) exhibit nonlinearity so that a DC balanced signal content does not produce a DC balanced optical signal. In one such embodiment it may be preferable to set the threshold to a value related to $(P_H+P_L)/x$ where x is different from 2. In one embodiment x is determined so that the threshold is equal to the average obtained from a DC balanced signal content. In one embodiment the method comprises setting the threshold determined in the manner of the prior art receivers such as those cited above.

In one embodiment at least one of the values $P_L$ and $P_H$ are obtained via at least one peak detector. In one embodiment the receiver circuit off-sets the electrical signal for example by a threshold value which seeks to be centered between the values $P_L$ and $P_H$. In one embodiment this off-set also off-sets the value detected by the peak detector and which therefore measures an off-set version of the high or low value of the optical signal. One example of such an implementation of peak detectors may be found in FIG. 6 of U.S. Pat. No. 5,371,763. In one embodiment the off-set value is a previous value, such as the previously set threshold. In one embodiment the present values $P_L$ and $P_H$ are therefore obtained relative to a previous threshold value. In one such example the receiver circuit shunts a variable current from the photocurrent from the photo detector as a way to set the threshold (see e.g. FIG. 3). Accordingly, $P_L$ and $P_H$ may depend on the current setting of the threshold for example when measured as the peak values from a voltage across a load resistors through which the remaining photocurrent runs. In another embodiment the peak detectors are arranged to process a signal which is substantially proportional to light impinging on the photo detector and therefore the values $P_L$ and $P_H$ are determined as values proportional to a current from the photo detector in response to the optical signal.

As will be well known to the skilled person peak detectors may be constructed in several ways. In one embodiment the peak detector will have a limited bandwidth $BW_P$ and/or the peak detector will be preceded by a low pass filter resulting in an effective bandwidth $BW_P$ for the peak detector. In one embodiment this allows the peak detector to ignore undesirable variations of the signal such as noise components and/or peaks caused by imperfections in the transmitter such as overshoot or undershoot. In one embodiment the peak detector comprises an amplifier, such as a difference amplifier, with a bandwidth $BW_P$. In one embodiment there is a trade-off between power consumption of such an amplifier and extent of the bandwidth to high frequencies. Out of concern for the power consumption of the receiver it may therefore be beneficial to design the peak detector with a lower bandwidth. The same may be true for a transmitter where a light source is driven to provide the specified bandwidth. If the transmitter is bandwidth limited, the rectangular shape of single 1 bit may be reduced to a soft peak which only achieves the peak value for a small duration of the bit period. In the event of consecutive transmission of the same value even a bandwidth limited amplifier will, in one embodiment, transmit the peak value for a substantial part of the time. In one such embodiment it may be advantageous to allow the peak detector to have a bandwidth with a cut off frequency below the required frequency for detecting the peak value of a single bit.

In one embodiment said peak detector has an effective bandwidth, said peak detector comprises a difference amplifier with a bandwidth $BW_P$ with an upper cut off frequency corresponding to the time period of one half bit or more, such as 1 bit or more, such as 2 bits or more, such as equal to 3 bits or more, such as equal to 4 bits or more, such as equal to 5 bits or more, such as equal to 10 bits or more, such as equal to 20 bits or more. In one embodiment said peak detector comprises a hold and/or reset function. In one embodiment the peak detector requires a number of consecutively identical bits to validly detect a peak value. In one such embodiment the peak detector holds this detected value until a new string of consecutively identical bits is received. In one embodiment the determination of when to hold and/or reset is incorporated into the peak detector. In one embodiment this determination is incorporated into the TAC discussed later in this text. In one embodiment holding the value of the peak detector occurs within the TAC.

In one embodiment the peak detector incorporates a capacitor or equivalent which is charged to the peak value. In one embodiment the peak detector therefore has a characteristic discharge time after which the output value changes significantly in the event of lack of input, in one embodiment this corresponds to the time span of 1 bit or more, such as 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more. In one embodiment the time span is equal to $10^4$ bits or shorter, such as equal to $10^3$ bits or shorter, such as equal to $10^2$ bits or shorter, such as equal to 10 bits or shorter, such as equal to 5 bits or shorter, such as equal to 4 bits or shorter, such as equal to 3 bits or shorter, such as equal to 2 bits or shorter, such as equal to 1 bit or shorter.

The extinction ratio of a binary optical signal having a high logic value (commonly) corresponding to 1 (ONE) and a low logic value (commonly) corresponding to 0 (ZERO) is the ratio of said high value divided by said low value. Here the high and low value is the electrical signal proportional to the impinging light on the photo detector i.e. without an offset such as discussed above. Assuming that the photo-detector is substantially linear and ignoring dark currents in the detector these high and low values will be proportional to the high and low values of the optical signal. Accurate determination of this ratio may be difficult when the low value approaches zero and the ratio approaches infinity. Similarly, in the event that the $P_H$ is deemed invalid and the threshold is set with reference to the low value, this determination may in one embodiment be influenced significantly by noise or dark currents in the photo detector if the low value is too close to zero, i.e. very little light from the optical signal impinges on the photo detector when a low value is transmitted. As discussed in U.S. Pat. No. 5,371,763 in regard to FIG. 4 of that patent it may be advantageous to set the low value above the threshold for the light source so that light is emitted when transmitting a zero value. This will often allow the light source to switch faster between a low and a high value and therefore increase the bandwidth of the transmitter.

In one embodiment the receiver, such as part of the TAC, comprises a circuit for enabling high extinction ratios and/or low values in the optical signal. In one embodiment the circuit sets the low value to a predetermined value in the event that the actual low value is below a preset value. In one embodiment the value is set to zero whereas in one embodiment the value is set to a small value relative to the high value. In one embodiment the low value is set to a value relative to the high value so that an extinction ratio, such as those values cited below, is obtained for the electrical signal.

In one embodiment the extinction ratio of the optical signal is less than or equal to 100 dB, such as less or equal to 50 dB, such as less than or equal to 30 dB, such as less than or equal to 20 dB, such as less than or equal to 10 dB, such as less than or equal to 5 dB, such as less than or equal to 3 dB, such as less than or equal to 2 dB. In one embodiment the extinction ratio of the optical signal is more than or equal to 2 dB, such as more than or equal to 3 dB, such as less than or equal to 5 dB, such as less than or equal to 10 dB, such as less than or equal to 15 dB, such as less than or equal to 20 dB, such as less than or equal to 50 dB, such as less than or equal to 100 dB.

In one embodiment the extinction ratio is applied in setting the threshold without calculating the extinction ratio itself. In one such embodiment each of the values $P_H$ and $P_L$ are applied to find a multiplication factor $N_H$ and $N_L$ times a common factor $I_0$, so that $P_H \propto N_H \cdot I_0$ and $P_L \propto N_L \cdot I_0$. Here the symbol $\propto$ indicates proportionality to indicate that in a given implementation there may be a scaling between e.g. $N_H \cdot I_0$ and $P_H$. For example $P_H$ may be a voltage corresponding to the current $N_H \cdot I_0$ passing through a resistor. In principle the two values may also be offset from each other by a constant which then must be considered when determining the threshold (an example of this is found in the examples relating to FIGS. 3 and 4 discussed below). This eventuality has been ignored here but is also within the scope of the invention. In most embodiments "$\propto$" indicates the same proportionality factor; however, different proportionality factors may be employed as long as this is considered when determining the threshold. This is also within the scope of the invention. In one embodiment the proportionality is one so that $P_H = N_H \cdot I_0$ and $P_L = N_L \cdot I_0$. Here the symbol "=" confers substantially equal. For example, N may be restricted to integer values so $N_L \cdot I_0$ has the finite resolution of $I_0$.

In one embodiment the threshold is determined as $I_0 \cdot (N_H + N_L)/2$ when both $P_H$ and $P_L$ are deemed valid. As mentioned above it may be advantageous to set the threshold as $I_0 \cdot (N_H + N_L)/x$ where x is a value different from 2. In the following x=2 is assumed but it is straightforward to accommodate the situation where another value of x may be advantageous. In one embodiment, the method comprises applying previous values of $N_H$ and $N_L$ and determining $I_0$ from a valid present value of $P_H$ or $P_L$ using the above relations of P, $I_0$ and N ($P_H \propto N_H \cdot e \propto N_L \cdot I0$) for the valid value $P_H$ or $P_L$. For example if $P_L$ is deemed invalid $N_H$ and $N_L$ may be kept constant and $I_0$ is recalculated using the relation $P_H \propto N_H \cdot I_0 \Leftrightarrow I_0 \propto N_H/P_H$ and the threshold is set to $I_0 \cdot (N_H + N_L)/2$. This corresponds to assuming a constant extinction ratio. In one embodiment the multiplication factors $N_H$ and $N_L$ form at least part of the extinction ratio parameters. In this case the extinction ratio is $(N_H + N_L)/2$. In one embodiment the valid value of $P_H$ is used in the event the $P_L$ is invalid and vice versa.

In one embodiment threshold is updated based on the relative change of the logic high or logic low value of the binary optical signal. In one embodiment the threshold is updated by changing the threshold by the same relative amount e.g. 10%. Here the threshold and the logic value may be seen as E parameters. In one such embodiment setting the present threshold is based on the relative change from the previous to the present value of said at least one measured previous $P_H$ value and present $P_H$ or previous $P_L$ value and present $P_L$ where $P_H$ or $P_L$ is optionally adjusted for an offset relative to said binary electrical signal. In one such embodiment updating said previous threshold to a present threshold by adjusting said previous threshold by substantially the same relative change. It is noted that in such embodiments it may be possible to only implement measurement of $P_H$ or $P_L$ if one or the other may be assumed always to be valid. This is generally not the case for unencoded data.

In one embodiment the method comprises determining the extinction ratio parameter E as an extinction ratio parameter $E_{div}$ proportional or equal to a high value divided by a low value (such as $$\frac{P_H}{P_L} \text{ or } \frac{P_H - \text{offset}}{P_L - \text{offset}}$$

depending on whether the value $P_H$ or $P_L$ is measured relative to an off-set relative to the photocurrent or not). This off-set is in one embodiment the latest set threshold. If, as an example, the optical signal causes a current from the photo detector to have a high value of 4 arbitrary units (A.u.) and a low value of 2 A.u. then the threshold is in one embodiment set to a center value between these values. I.e. the receiver will set a threshold corresponding to 3 A.u. Here the phrase "correspond to" is applied to indicate that the threshold may for example be set as a voltage instead of a current. This voltage corresponds to a current value at the position in the receiver where the quoted high and low values of the current are determined. If the values $P_H$ or $P_L$ are measured relative to this threshold the values will be measured to correspond to +1 A.u. and −1 A.u. Since the invention relies on the stability of the extinction ratio from the transmitter, i.e. of the optical signal, this must be considered when the extinction ratio parameter is calculated.

In one embodiment the present threshold is determined using a previous value of $E_{div}$ and a valid value of the present $P_H$ or $P_L$ so that said present threshold is set to a value relating to $P_H*(1+1/E_{div})/2$ or $P_L*(1+E_{div})/2$. Here the offset has been assumed to be zero for ease of notation. As mentioned above, divisions may be difficult to calculate robustly when little or no light corresponds to a low value in the optical signal. However, this is in one embodiment handled by using the above method using $N_H$ and $N_L$ times $I_o$, setting the low value to a predetermined value or ensuring that the transmitter always provides a substantial amount of light, i.e. a finite extinction ratio.

In one embodiment the method further comprises initializing the previous $P_H$ value, the previous $P_L$ value and/or the at least one former extinction ratio parameter(s) E, such as by finding a first value for $P_H$, $P_L$ and/or E. In one embodiment these values may be reinitialized either during operation or as a response to an error. An error could for example be that one or more of these values assume an illegal value or temporary loss of contact with transmitter at the other end from the receiver. In one embodiment where the values $N_H$ and $N_L$ are applied as described above, the values $N_H$ and $N_L$ and $I_0$ are initialized by setting $N_H$ or $N_L$ to an initial value (for example 128, 200 or 1000), and subsequently determining $I_o$ applying the respective value of $P_H$ or $P_L$. In one embodiment the initialization is performed by setting the initial threshold to zero, determining $P_H$ relative to this threshold and setting $N_H$ to a value and finding $I_0$. In one embodiment the initialization is performed by setting the initial threshold to a high value and determining $P_L$ relative to this threshold and setting $N_L$ to a value.

In one embodiment the initialization is performed during reception of a known signal. In one embodiment, the optical receiver forms part of a two-way link having a far end receiver, a near end receiver, a far end transmitter and a near end transmitter. In one embodiment the near end receiver and transmitter cooperate to determine whether an optical connection (typically via a fiber or air) is established to a far end. In one embodiment the transmitter sends out test pulses at regular intervals. These pulses are in one embodiment kept at a relatively high power level to ensure reception at the far end even if the link is poor. On the other hand, the pulses are in one embodiment kept short to ensure eye safety. At the same time the receiver is arranged to detect test pulses from the far end. In one embodiment the receiver circuit is arranged to a have a specific mode of operation only suitable for detection of an incoming pulse. In this way the receiver circuit may reduce power consumption during time where no connection is established. In the event that a test pulse is received the near end transmitter may begin to transmit one or more preset data series allowing the far end receiver to initialize. Similarly, the far end transmitter may begin to transmit one or more preset data series allowing the near end receiver to initialize. In one embodiment, this initialization process further comprises sending data quality parameters between the near end and far end, e.g. to optimize the transmitters. In one embodiment it is advantageous that the transmitter transmits with minimal power consumption while at the same time providing robust reception of the signal at the other end. The above consideration regarding initialization and self-configuration of an optical link is the focus of co-pending U.S. Provisional Application for a Patent 61/228,848.

In one embodiment the method further comprises determining an average (AVG) of the electrical signal. In one embodiment the circuit comprises an averaging circuit (such as a suitable low pass filter) whereas in one embodiment AVG is determined as part of the TAC. The value of AVG may be applied to determine the DC balance of the signal i.e. the ratio of ZEROs and ONEs. As will be discussed further below in regard to validation of the P-values, an average substantially offset from the threshold may in one embodiment indicate that the high or low values are rarely experienced so this peak value may not be accurately determined (i.e. valid).

In one embodiment the AVG is calculated from a time period, such as equal to or longer than $10^{-9}$ seconds, such as equal to or longer than $10^{-8}$ seconds, such as equal to or longer than $10^{-7}$ seconds, such as equal to or longer than $10^{-6}$ seconds, such as equal to or longer than $10^{-5}$ seconds, such as equal to or longer than $10^{-4}$ seconds, such as equal to or longer than $10^{-3}$ seconds, such as equal to or longer than $10^{-2}$ seconds, such as equal to or longer than $10^{-1}$ seconds, such as equal to or longer than 1 second. In one embodiment the average AVG is taken over a time period, such as equal to or shorter than 1 second, such as equal to or shorter than $10^{-1}$ seconds, such as equal to or shorter than $10^{-2}$ seconds, such as equal to or shorter than $10^{-3}$ seconds, such as equal to or shorter than $10^{-4}$ seconds, such as equal to or shorter than $10^{-5}$ seconds, such as equal to or shorter than $10^{-6}$ seconds, such as equal to or shorter than $10^{-7}$ seconds, such as equal to or shorter than $10^{-8}$ seconds, such as equal to or shorter than $10^{-9}$ seconds. In one embodiment said average is over a period substantially equal to 1 bit or more, such as equal to 2 bits or more, such as equal to 3 bits or more, such as equal to 4 bits or more, such as equal to 5 bits or more, such as equal to 10 bits or more, such as equal to 20 bits or more, such as equal to 30 bits or more, such as equal to 40 bits or more, such as equal to 50 bits or more, such as equal to 100 bits or more, such as equal to $10^3$ bits or more, such as equal to $10^4$ bits or more, where the duration of 1 bit may be determined from the bit rate BR. In one embodiment the time period is substantially equal to $10^4$ bit or less, such as equal to $10^3$ bits or less, such as equal to 100 bits or less, such as equal to 50 bits or less, such as equal to 40 bits or less, such as equal to 20 bits or less, such as equal to 10 bits or less, such as equal to 5 bits or less, such as equal to 3 bits or less, such as equal to 2 bits or less, such as equal to 1 bit or less.

In one embodiment the AVG is obtained from a period related to the discharge time of the peak detectors discussed above. In one embodiment AVG is calculated from a time period corresponding to 10% or more of said discharge time, such as 20% or more of said discharge time, such as 30% or more of said discharge time, such as 40% or more of said discharge time, such as 50% or more of said discharge time, such as 60% or more of said discharge time, such as 70% or more of said discharge time, such as 80% or more of said discharge time, such as 90% or more of said discharge time, such as 100% or more of said discharge time, such as 110% or more of said discharge time.

In one embodiment the method further comprises applying an activity detector (i.e. a circuit with a function) to indicate the activity in the electrical signal. As will be explained below, an activity detector may in one embodiment provide the TAC with an indicator of the properties of the signal received. Depending on the construction of the peak detector the value determined by the peak detector may depend on the peak (i.e. the size and shape of the signal corresponding to a bit) and the bit pattern i.e. the ratio of ZEROs to ONEs and/or how often identical bits are received consecutively e.g. for two, three, four, five or ten bits in a row. To determine the validity of the peak value it may therefore be useful that an activity detector is a circuit that provides or allows the TAC or other circuitry to calculate an indicator value for one or more of:

1. Number of transitions between (logic) high and (logic) low within a predetermined time period.
2. Number incidences of high and/or low values longer than a predetermined length over a predetermined time period, in other words the number of CIDs of logic high and/or low values longer than a predetermined length (e.g. 3) over a predetermined time period.

In one embodiment the predetermined time period may be any of the values cited in relation to the determination of the average above and/or in regard to present and previous above. In one embodiment the predetermined time period is not specifically determined but rather a time within a suitable range is used. In one embodiment the indicator value is a voltage or current proportional to the number. In one embodiment the indicator is a digital value proportional to the number. In one embodiment the indicator is a binary value which indicates whether the number exceeds a specified threshold, such as 1 or more, such as 2 or more, such as 10 or more, such as 100 or more. In one embodiment the indicator values are updated similarly as a rolling average i.e. substantially continuously whereas in one embodiment the activity detector provides indicator(s) for non-overlapping time segments. The latter may in one embodiment be implemented via a counter counting the number of relevant events and said counter having a hold register for holding a value and a reset function. Storing the value in the hold register and resetting the counter may then, for example, be controlled by a digital oscillator with a set frequency. In this way the indicator value may for example be updated each time the predetermined time interval expires.

In one embodiment two or more peak detectors are applied to detect the high value or equivalently different functionality may be applied by the same peak detector. Each peak detector has a bandwidth and discharge time so that the peak detector is better suited to detect the peak value for an activity level. In one embodiment one peak detector is designed to obtain the peak value for a very long constant signal, whereas a second peak detector is suitable for detecting a peak value for a medium amount of signal activity. In one embodiment an indicator from the activity detector allows the TAC to determine which peak value to apply. In one embodiment applying separate peak detectors and/or applying different functionality in one peak detector depending on signal activity may provide better noise resistance as the same noise will influence determination of the peak differently depending on whether signal changes frequently (i.e. have many transitions) or is substantially constant. In one embodiment the bandwidth for the two or more peak detectors is different where the upper bandwidth is lower for the peak detector arranged to detect the peak value of a substantially constant signal.

The threshold adjustment circuit (TAC) may in one embodiment be implemented in digital circuitry, analog circuitry or a combination thereof. In one embodiment the inclusion of a TAC circuit confers that the receiver comprises circuitry which allows automatic adjustment of the threshold during operation. It may in one embodiment be a separate circuit either integrated along with the remaining receiver circuit or alone. In one embodiment the TAC may be considered as an integrated controller which may or may not be programmable. In one embodiment the part of the TAC belongs to an external circuit such as in an external controller. For example the determination of validity of the peak values as well as the determination of threshold may reside with an external controller not integrated with the electrical high speed data path of the receiver, e.g. transimpedance amplifier and a decision circuit, whereas circuitry for adjusting the threshold and/or circuitry assisting in applying the peak values (e.g. the circuit of FIG. 4 below) could be internal circuits. The term decision circuit refers to circuit arranged to provide an essentially binary data stream from an analog input signal. Other terms used in the art are comparator and digital quantizer. Commonly a limiting amplifier is applied as the decision circuit.

In one embodiment one or more functions belonging to the TAC are integrated into one or more functions of the receiver circuit. One example could be integrating one or more functions of the TAC into one or more peak detectors so that each peak detector may determine whether the apparent value detected from the signal should be deemed valid. In the present text it is assumed that the validation of the values $P_H$ or $P_L$ resides in a distinct TAC circuit but it should be kept in mind that the invention is not limited to such implementation. Setting of the threshold may be confined to a separate circuit or distributed in the receiver circuit such as into the peak detectors. The threshold may be set in one or more of several parts of the receiver circuit depending on the design of the circuit. In one embodiment the threshold is set by a shunt current source suitable for shunting part of the current from the photo detector so as to adjust signal input to a decision circuit relative to a reference value for the decision circuit effectively adjusting the threshold for the binary electrical signal. In one embodiment the threshold is set by an offset for an amplifier, such as an amplifier converting a current from the photo detector to a voltage. Such an amplifier could for example be a transimpedance amplifier or an equivalent. In one embodiment the threshold is set as a threshold for a decision circuit, such as a differential amplifier having the threshold as one input and an electrical signal as the other. This amplifier may in one embodiment be wholly or partly limiting.

As discussed above, the determination of the validity of either $P_H$ or $P_L$ resides with the TAC either as a separate circuit or integrated into one or more functions of the remaining receiver circuit. In one embodiment the present $P_H$ value is deemed invalid in the event that the current signal over an extensive time period adjacent to determining the present $P_H$ value has been dominated by low values, i.e. no or few high values have been received for an extensive time period. Similarly, the present $P_L$ value is invalid in the event that the current signal over an extensive time period adjacent to determining the present $P_L$ value has been dominated by high values. In one embodiment "dominated" is more than 50% of the time, such as more than 60%, such as more than 70%, such as more than 80%, such as more than 90%, such as more than 95%, such as 100%.

In one embodiment dominated by for example high values refers to no or few occurrences of 2 or more identical low value bits consecutively in a period of time, such as 3 or more bits, such as 4 or more bits, such as 5 or more bits, such as 6 or more bits, such as 10 or more bits and vice versa. In other words, this means that the optical signal may be said to be dominated by high values when a specified length of CIDs of low values occurs rarely or not at all. In one embodiment, the term rarely relates to the properties of the respective peak detector. The peak detector may require a number of occurrences of CIDs of specified length to obtain an accurate measurement. Rarely refers here to a number below this value. In one embodiment rarely refers to less than 1000, such as less than 100, such as less than 50, such as less than 10, such as less than 5, such as less than 2 within said time period.

In one embodiment the said extensive time period takes one of the possible values specified in relation to the determination of AVG, said discharge time of the peak detectors or specified in relation to the span between previous and present values.

In one embodiment the threshold ($TH_P$) is compared to the average AVG of the electrical signal to determine the validity of $P_L$ or $P_H$. In one embodiment a threshold $TH_P$ determined using either said $P_L$ or $P_H$ and at least one previous extinction ratio parameter E is compared to AVG to determine the validity of $P_L$ or $P_H$. For a DC balanced signal AVG and $TH_P$ should preferably be substantially equal. In one embodiment $TH_P$ and AVG are obtained at different times. For example; in one embodiment $TH_P$ is a previous $TH_P$ whereas AVG is the present AVG. One such previous value could in one embodiment be the latest value of $TH_P$ and this threshold is assumed substantially constant when the DC balance of the signal is evaluated. In one embodiment the time span between obtaining $TH_P$ and AVG is substantially less than the time period within which the transmitter may be expected to drift or optical loss change, i.e. the previous threshold $TH_P$ should still be a valid threshold at the time of comparison. In one embodiment this time span may be any of the times or in relation to the previous and present values or AVG.

In one embodiment a substantial deviation between AVG and $TH_P$ indicates that either present $P_L$ or $P_H$ is invalid, so that a. when $AVG>TH_P$ then $P_L$ is deemed invalid and b. when $AVG<TH_P$ then $P_H$ is deemed invalid.

In one embodiment the deviation is calculated as $$100\% \cdot \left|2\frac{AVG - TH_P}{P_H - P_L}\right|,$$

so that an AVG equal to either the previous $P_L$ or $P_H$ is a 100% deviation. In one embodiment a substantial deviation is larger than or equal to 5%, such as larger than of equal to 10%, such as larger than of equal to 20%, such as larger than of equal to 30%, such as larger than of equal to 40%, such as larger than of equal to 50%, such as larger than of equal to 60%, such as larger than of equal to 70%, such as larger than of equal to 80%, such as larger than of equal to 90%, such as larger than of equal to 95%.

As previously mentioned the peak detectors commonly have a discharge rate. Therefore, the decrease of the output of a peak detector with a similar rate may be an indicator that respective signal value is not present and the measurement may therefore be invalid. Therefore in one embodiment a rate of change in $P_L$ or $P_H$ indicates that said $P_L$ or $P_H$ is invalid. In one embodiment the rate of change, of e.g. AVG, in the event of a long set of CIDs may be different from the discharge rate of the peak detector. Therefore, their relative change may be an indicator of the signal comprising e.g. a long set of CIDs. Furthermore, in this event the other peak detector will likely exhibit little change which may be a further indicator of a long set of CIDs. Accordingly, in one embodiment a change in $P_L$ or $P_H$, optionally adjusted for an offset relative to said binary electrical signal, relative to the other value and/or an average value related to the electrical binary signal indicates that said changing $P_L$ or $P_H$ is invalid.

In one embodiment one or more of the above indicators may be combined to determine the validity of the measurement of $P_L$ and/or $P_H$. For example the activity detector may be applied in combination with deviation of AVG and $TH_P$ to determine validity. This is further discussed in relation to activity states below.

In one embodiment one or more of the indicators and values available to the TAC such as the indicators from the activity detector optionally in combination with said AVG, previous threshold, present threshold, previous $P_L$ and/or $P_H$ and/or present $P_L$ or $P_H$, the rate of chance in said $P_L$ or $P_H$, the relative change in said $P_L$ or $P_H$, the deviation between AVG and a threshold, one or more indicator values obtained via said activity detector, and the domination of the other value in determining said $P_L$ or $P_H$ allow the TAC to determine a state of the signal. In one embodiment the state of the signal is taken to mean that the TAC considers the factors for setting said state when determining the validity of the peak measurement. In one embodiment the TAC applies an indicator to indicate the state but this may not be necessary. Therefore, in one embodiment said present $P_L$ or $P_H$ value is determined by a Threshold Adjustment Circuit (TAC) from two or more of the parameters mentioned above ($P_H$ and $P_L$ optionally adjusted for an offset relative to said binary electrical signal).

In one embodiment the states comprise two or more of the following possibilities:
 a. High activity
 b. Medium activity
 c. Low activity In one embodiment high activity is taken to mean that the signal comprises many transitions, such as near or substantially like a dotting sequence. As discussed above, a peak detector may in one embodiment not have sufficient bandwidth to determine $P_L$ or $P_H$ during high activity. In one embodiment high activity is defined as sufficiently high activity so that substantially accurate detection of either $P_L$ or $P_H$ is unlikely. In one embodiment unlikely is less than 99% such as less than 95%, such as less than 90%, such as less than 75%, such as less than 50%. In one embodiment substantially accurate is taken to mean within 50%, such as within 30%, such as within 15%, such as within 10%, such as within 5%, such as within 1%. In one embodiment the limited bandwidth in the determination of $P_L$ or $P_H$ will cause these values to be underestimated. In one embodiment this error may be estimated from the activity and/or the DC balance of the signal and therefore a compensation for this error may be possible. Therefore in one embodiment the method comprises estimating the error and compensating the peak values accordingly before updating the threshold.

In one embodiment the AVG value may be applied in determining whether the activity is high in the sense that accurate detection is unlikely. In the event that AVG deviates substantially from the threshold it may be likely that a substantial amount of consecutively high or low values are found in the signal pattern and therefore the corresponding peak value may still be detected. In one embodiment such a situation will cause the TAC to determine that the state of the signal is "medium activity" instead of "high activity" even though a high number of transitions may occur. In one embodiment the activity detector provides an indicator relating to the number of consecutively identical bits. In one such embodiment the comparison of AVG with the threshold may be less relevant in order to determine whether $P_L$ or $P_H$ may be determined robustly. Instead the TAC may in one embodiment deem that the signal comprises "high activity" only when this is not the case.

One or more actions may be taken by the TAC when a high activity state is determined. In one embodiment a state of high activity causes said TAC to perform at least one of the following
 a. determining the DC balance of the signal by determining a deviation between AVG and $TH_E$, and adding suitable offset values to $P_L$ and/or $P_H$ optionally depending on said deviation
 b. maintaining a constant threshold.

In one embodiment a setting of "Medium activity" corresponds to sufficient activity of transitions occur within the time with which the transmitter is expected to drift and/or optical loss changes, while at the same time sufficiently long strings of consecutively identical values are likely, so that either $P_L$ or $P_H$ is likely attainable with sufficient accuracy. In one embodiment the TAC will then set the threshold according to what has been discussed above in the event that either P value is invalid or substantially in the center between $P_L$ and $P_H$. The latter value may in one embodiment either be found using $P_L$ and $P_H$ or either value and the extinction ratio.

In one embodiment low activity indicates that few transitions occurs within a time frame where the transmitter is likely to drift or optical loss change or a time frame corresponding to the discharge time of the peak detectors so that their output is not reliable even if the signal is constant. In this setting the receiver may in one embodiment utilize a specialized peak detector with a long discharge time or a reset and hold as mentioned previously. With low activity either $P_L$ or $P_H$ is likely deemed invalid and the threshold may be set according to the methods discussed above.

In one embodiment the threshold is updated at certain intervals which are preferably shorter than the time span in which the transmitter is expected to drift or changes in insertion loss are likely to occur. There may therefore be a significant difference for links applied in e.g. a computer server which is rarely physically moved and a link applied to connect two consumer products where an optical fiber may be exposed to bending. The time frame may therefore in one embodiment be any of times cited in relation to the span between previous and present values. Drift in the transmitter may for example be caused by temperature which, in one embodiment, is compensated to some degree by the driver of the light source. Accordingly, large drift may in one embodiment be expected only for large temperature changes. Another contribution to drift may be aging depending on age, time in operation and/or amount of optical energy generated by the light source. Depending on the light source such aging may cause more or less abrupt changes. A skilled person may therefore, in one embodiment, take these times into account so that the threshold is updated sufficiently often to accommodate changes while not so often that an intolerable increase in power consumption occurs in the receiver.

As should now be clear to the skilled person, the obtainable performance of the peak detectors (or any other circuit for determining the high and/low value of the signal) must in one embodiment be balanced against the received signal pattern. Therefore, to implement one embodiment of the invention the designer must device suitable tests for detecting when a peak value may not be valid. The previous text has provided several examples of such tests but other indicators may be devised without parting from the scope of the invention. It may in one embodiment be necessary for the designer of the receiver to balance the complexity of the indicators with the robustness of the system. Often more complex tests will lead to a more complex circuit which potentially has high power consumption and/or chip area consumption. A designer could, for example, apply a simulation tool to determine whether a specified design of peak detectors (or another method of determining the high and/low value) and the designed indicators and TAC are sufficiently robust.

DESCRIPTION OF DRAWINGS AND EXAMPLES

Figure 2:
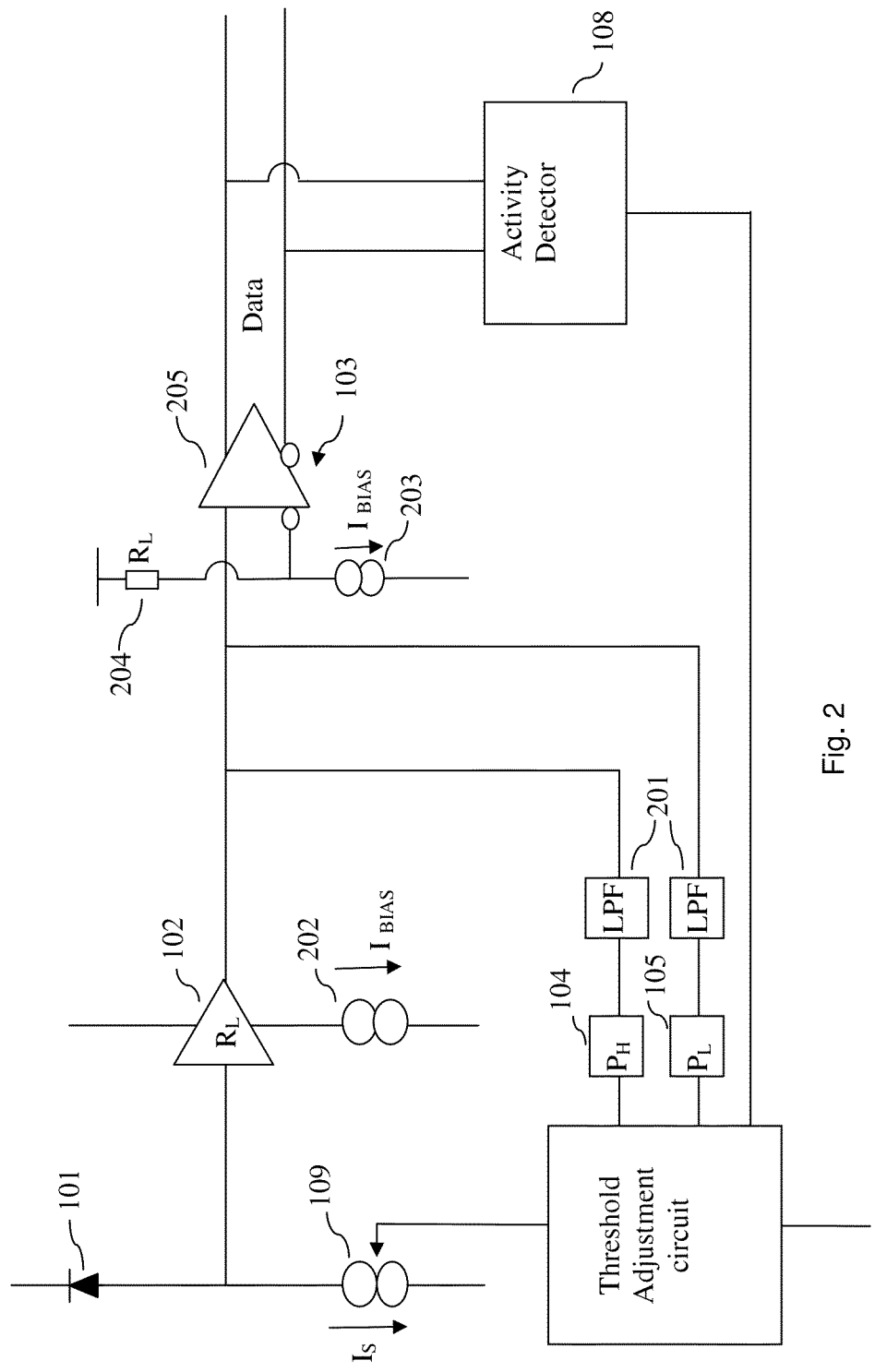
Figure 3:
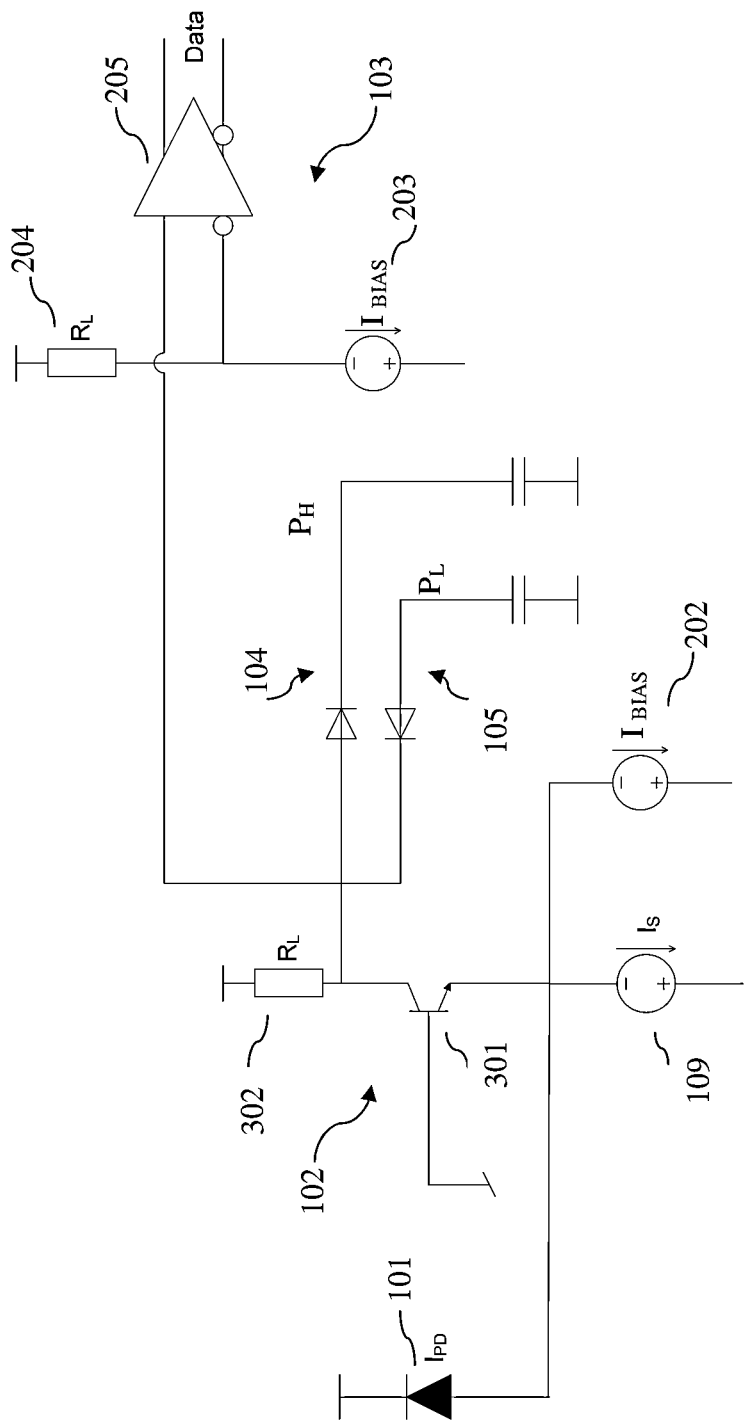
Figure 4:
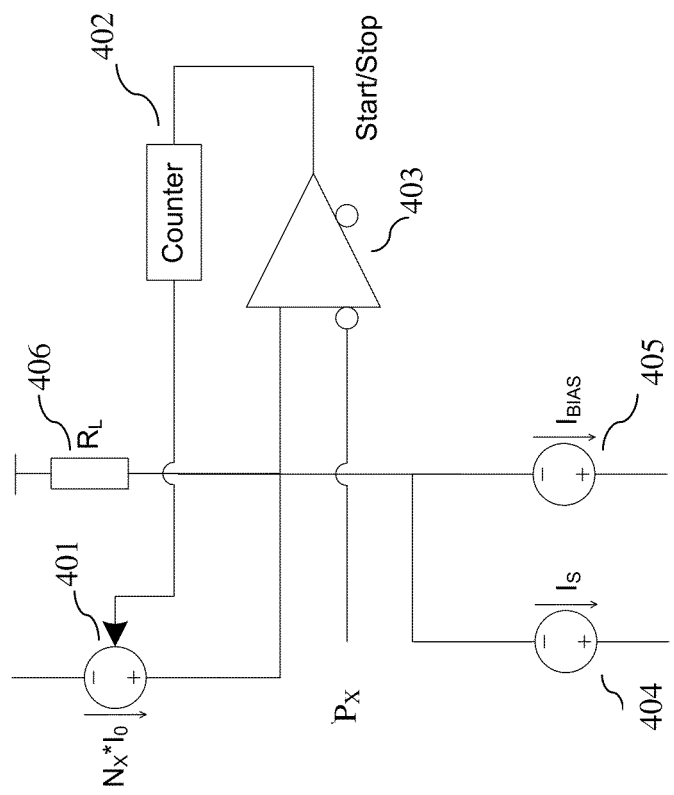
Figure 5:
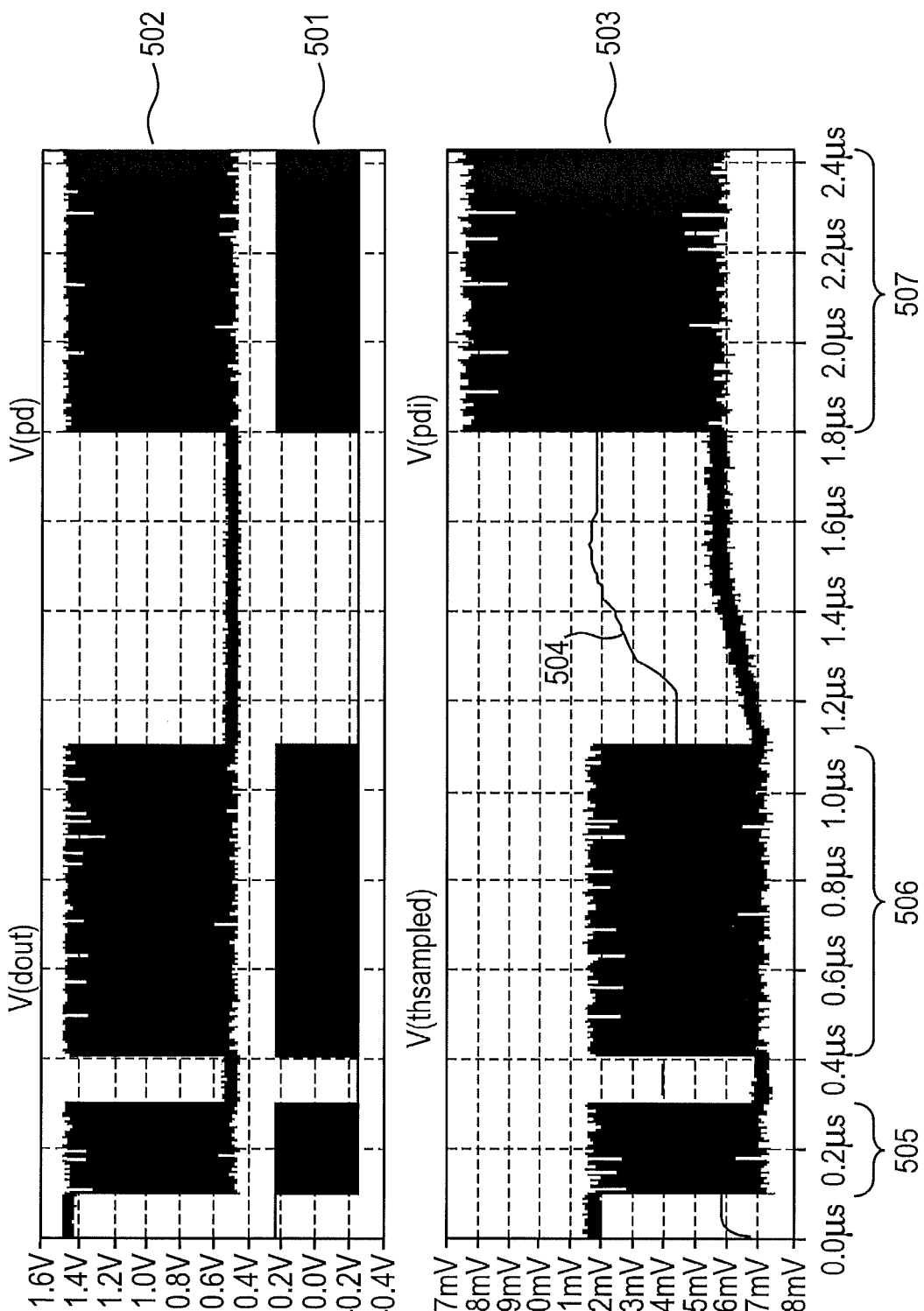
Figure 6:
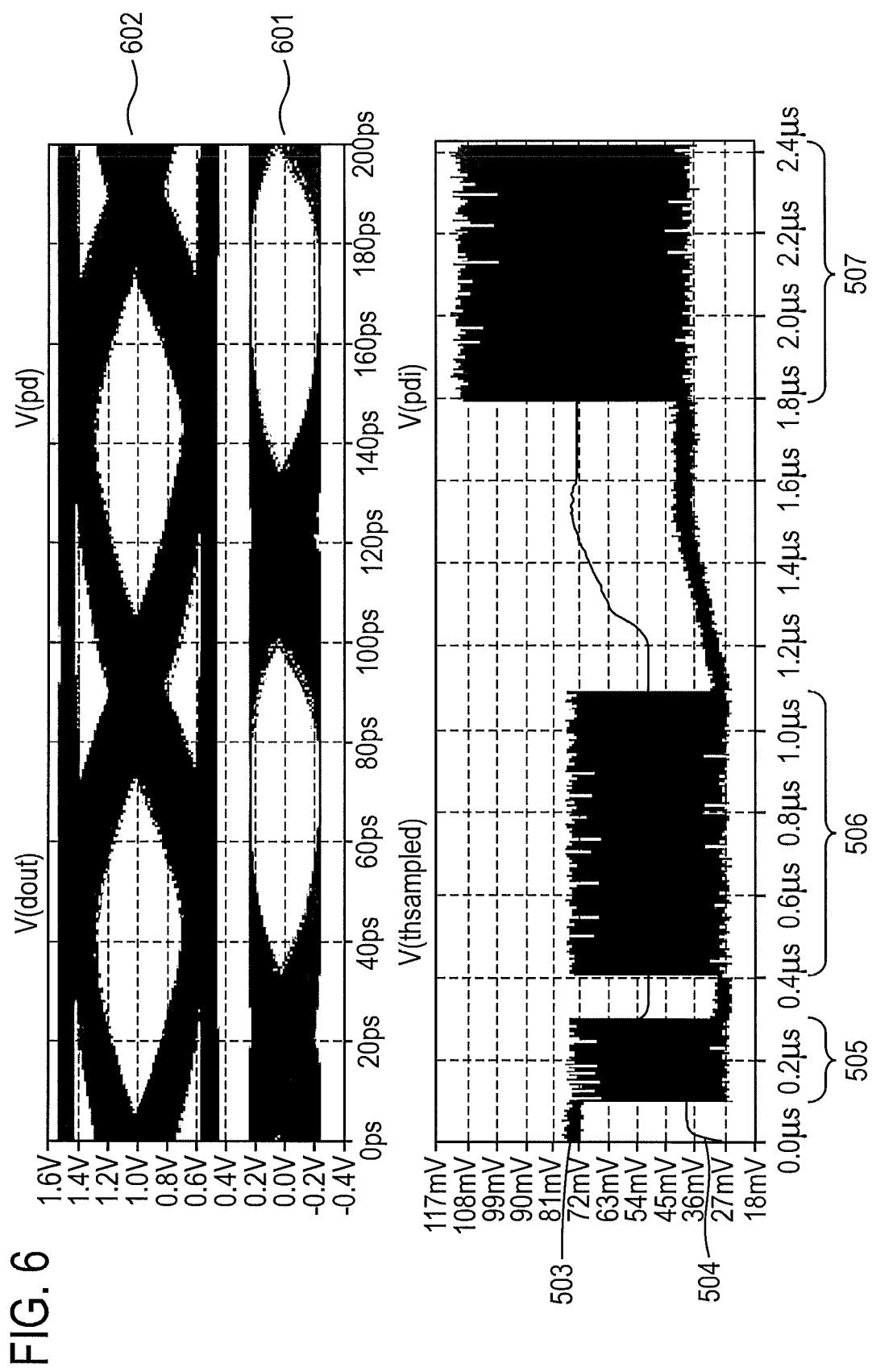
Figure 7:
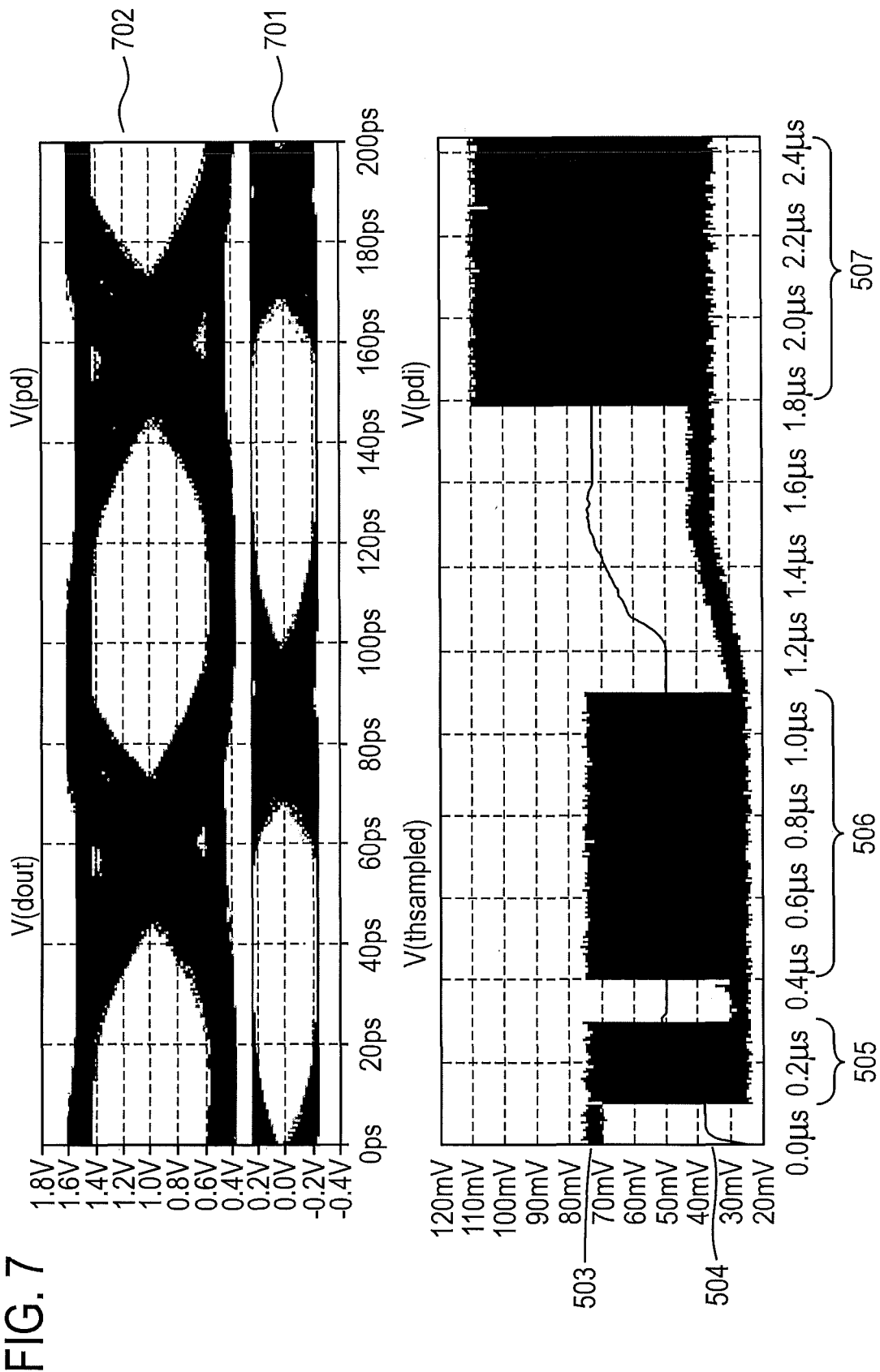

The invention will be explained more fully below in connection with a preferred embodiment and with reference to the drawings in which:

FIG. 1 shows a schematic outline of an optical receiver implementing the method according to the invention, FIG. 2 shows a schematic outline of an optical receiver implementing the method according to the invention, FIG. 3 shows a schematic outline of an optical receiver implementing the method according to the invention, FIG. 4 shows a schematic outline of a circuit suitable for determining the values of $N_H$, $N_L$ and/or $I_0$, FIG. 5 shows simulated data from an optical receiver similar to the receiver of FIG. 3, FIG. 6 shows simulated data from an optical receiver similar to the receiver of FIG. 3 and FIG. 7 shows simulated data from an optical receiver similar to the receiver of FIG. 3.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows a schematic outline of a receiver implementing the method of the invention. The photodiode 101 acts as the photo detector receiving the optical signal (not shown). The amplifier 102 processes the electrical signal (in this case a current) generated by the photodiode. The amplifier 102 may for example be arranged to convert the current signal to a voltage signal. The output of the amplifier is then fed into the decision circuit which outputs the received data. One example of decision circuit is a limiting differential amplifier. The circuit further comprises two peak detectors 104 and 105 arranged to determine a value of $P_H$ and $P_L$ respectively. In FIG. 1 these peak detectors are placed between the amplifier 102 and the decision circuit 103 but other positions are feasible as long as $P_H$ and $P_L$ reflect the logic levels of the optical b, such as before the amplifier 102 or after the decision circuit 103. The latter in cases where the decision circuit is not limiting. Optical receivers often comprise circuitry arranged to provide the output data in a particular format to the subsequent circuit in the system. Such circuitry could comprise a clock and data recovery circuit (a CDR) and/or an output driver stage for transmitting the output data e.g. to a 50 Ohm transmission line.

The receiver circuit further comprises a TAC 106 which is connected to the peak detectors 104, 105 and to one or more possible connections (indicated by dotted lines. Firstly, the TAC may in one embodiment be connected to a circuit 107 suitable for determining an average. Similarly to the peak detectors the circuit 107 may be placed before the amplifier 102 or after the decision circuit 103 depending on the design of the circuit. Furthermore the TAC may be connected to an activity detector 108. Similarly to the peak detectors and the averaging circuit 107 the activity detector may be placed so as to measure the signal in one or more feasible locations within the circuit. In this case it has been chosen to measure the activity of the outgoing data signal as this signal is likely to be well defined, at least in terms of transitions, once a first threshold has been set. As discussed previously the TAC 106 may be arranged to adjust the threshold in several positions within a receiver circuit. In one embodiment the current of a shunting current source is adjusted by the TAC. In this way the output of 102 may be brought to vary relative to an offset, such as the center value between the measured peaks (see also FIGS. 2 and 3). Alternatively, an offset value may be adjusted on the amplifier 102 or a threshold value may be provided directly to the decision circuit 103. The latter may in one example be as one input into a differential amplifier where the electrical signal is the other input, thus causing the differential output to change sign after a transition.

FIG. 2 is one embodiment of the embodiments outlined in FIG. 1. In this embodiment the threshold is adjusted by adjusting the shunt current source 109. The TAC receives its input from the peak detectors 104 and 105. Both detectors are preceded by a low pass filter 201. As discussed above it may in one embodiment be beneficial to have a limited bandwidth in the detection of the peak. In one embodiment the low pass filters are equivalent to the peak detectors having a limited bandwidth less than the signal bandwidth. In one embodiment the low pass filters are arranged to reduce high frequency noise and/or undesirable spikes or peaks in the signal. In the receiver of FIG. 2 the amplifier 102 is powered by a bias current source 202 providing a current $I_{bias}$. The amplifier is designed so that when zero current is fed into the amplifier i.e. the current from the diode 101 is equal to current from the shunt source 109, the voltage output corresponds to the current $I_{bias}$ through an internal load resistor $R_L$ (not shown) either relative to ground or to the positive supply. The decision circuit 103 consists of a current source 203 arranged to draw a current substantially identical to the bias current from the source 202, a load resistor arranged to be substantially equal to the load resistor for the amplifier 102 and a differential amplifier 205. In this way, when the photo current is equal to the shunt current the output voltage from the amplifier 102 will correspond substantially to the voltage on the lower note of the amplifier 205 of the decision circuit. In other words, when the shunt current is set to the correct threshold the output voltage from the amplifier 102 will swing relative to the voltage on the lower input of the amplifier 205.

FIG. 3 shows a schematic outline of a receiver circuit similar to that of FIG. 2. In this embodiment the construction of the amplifier 102 has been outlined by showing a transistor 301 connected to a load resistor 302. The peak detectors 104 and 105 are shown in a schematic outline using a diode and a capacitor. In one embodiment the actual implementation of the peak detectors is more complex than shown. The decision circuit corresponds to that of FIG. 2. The TAC along with the activity detector, averaging circuits or other circuits for validating the measured peak values are not shown in FIG. 3.

FIG. 4 shows a schematic outline of a measurement circuit suitable for finding the values for either $N_H$, $N_L$ or $I_0$. As previously discussed, these parameters may be applied in setting the threshold according to one embodiment of the method of the invention. This circuit could for example form part of a TAC controlling the threshold in any of FIGS. 1-3. In FIG. 4 $N_X$ refers to either $N_H$ or $N_L$. In one embodiment two or more of these circuits are included, each with the task of determining one of the values. In one embodiment the values of the current sources and the load resistor are scaled such as to conserve current consumption of the circuit. In one embodiment a single circuit is included to reduce complexity. In one embodiment the circuit of FIG. 4 may be said to form part of the TAC or to be controlled by the TAC.

In one embodiment the values $N_H$, $N_L$ or $I_0$ are measured and initialized as below where the circuit of FIG. 4 forms part of the TAC in a receiver circuit such as that of FIG. 3. During initialization the receiver is assumed to receive an appropriate (possibly predetermined) signal in steps 2 through 8 for example during initialization of a link as discussed above:

1. Initialize $I_S$ to 0
2. Set $N_H(0)=128$ and use the value of $P_H$, obtained from the receiver circuit in FIG. 3, to calculate $I_o$ using the circuit of FIG. 4, i.e.
   $N_H=128$ is set as an exemplary starting integer. Too high an integer requires additional computation whereas too low a value provides a more crude scale for a later determination of the peak value as a product of $N_H$ and $I_0$
3. The value of $I_0$ is found by using $P_H$ as the lower input to the amplifier 403. A high value on the output causes the counter 402 to start counting which in turn increases the current $N_H I_0$ by adjusting this size of $I_0$. When the current drawn through the load resistor 406 equals that drawn through the resistor 302 off opposite sign, the input balances out and the counter stops. In one embodiment the circuit of FIG. 4 further includes an indication of when a determination has been completed.
4. Calculate $N_L(0)$ from $P_L$ (again obtained from the receiver circuit) and the above calculated value of $I_0$ using a circuit according to FIG. 4 where $P_L$ and $I_0$ are applied as input.
5. Adjust $I_S=(N_H(0)+N_L(0))*I_0/2$
   Adjust $I_S$ in both FIGS. 3 and 4.
6. Recalculate $N_H(1)$ from the new value of $P_H$ obtained after the threshold for the circuit has be adjusted. Here it is noted that the peak values are determined relative to the threshold in FIG. 3. However, the relative arrangement of the inverting input of the amplifier 403 and the current sources 401 and 404 in comparison with the relative arrangement of the current source 109, resistor 302 and the peak detectors 104 105 ensures that the offset provided by the current $I_S$ in the receiver 103 does not affect the measurement of $N_x$ in the circuit of FIG. 4. Similarly so for the offset provided by the bias current sources and the voltage drop over the load resistor $R_L$ from the supply voltage. Hence this offset does not substantially affect the determination $N_H$ or $N_L$.
   $N_H(0)$ is ideally equal to $N_H(1)$, i.e. the values found in first and second iteration, but the new bias point for the peak detectors may provide a more accurate output from the peak detectors.
7. Recalculate $N_L(1)$ from the new value of $V_{PL}$
   Again, $N_L(0)$ is ideally equal to $N_L(1)$ but the new bias point may influence the measurement.
8. The threshold is optionally adjusted again so $I_S=(N_H(1)+N_L(1))*I_0/2$ in both FIGS. 3 and 4. This is the end of the initialization.
9. Whenever $P_H$ and $P_{PL}$ are both valid, recalculate $N_H$ and $N_L$ from steps 5) to 7).
10. Whenever only $P_H$ and $P_{PL}$ are valid, keep $N_H$ and $N_L$ constant and adjust $I_0$ relative to the valid value.
    Re adjust $I_S$ accordingly. As noted above this corresponds to assuming that the extinction ratio is constant.

FIG. 5 shows simulated data obtained from a simulation of a receiver according to FIGS. 3 and 4. The following assumptions:

Signal input having a PRBS sequence followed by a long CID (Consecutive Identical Digit) pattern.

Relaxation effects and RIN noise from the light source have been included.

The receiver input sensitivity noise has been added.

The AOP (average optical power) for the incoming signal has been changed and the effect on the output jitter has been shown.

Extinction ratio is constant.

The simulation has been performed assuming a circuit made in BiCMOS9 from STMicroElectronics.

Calculation of $I_S$ was simulated with ideal components whereas TIA and peak detectors were simulated using simulated non-ideal components Note that in FIGS. 5-7 the AOP has been changed very rapidly in the simulation (less than 0.5 μs). This is unlikely in a real line therefore the simulated threshold is likely not valid during this period.

A data rate of 10 Gb/s

The results show that the added jitter in the recovered signal in this example is less than 6 ps assuming a worst case scenario with minimum OMA (optical modulation amplitude) and assuming the AOP increases with approximately 1.8 dB during a constant signal of 0's.

FIG. 5 shows the curve 501 which is the data recovered in the receiver. Data transmitted including jitter and noise is seen in curve 502 whereas the threshold tracked by the receiver is seen in curve 504 and the received data in the receiver is seen in curve 503. Note that the received data differs from the transmitted data in amplitude due to optical attenuation. In this example the channel is bandwidth limited. In the time segment 505 from 0.1 to 0.3 μs the data is treated as initialization data. The data received during the segment 506 is provided with one OMA and AOP whereas the data received during the segment 507 is transmitted with another OMA and AOP. It is noted that the receiver appears to track the threshold correctly for both sets of data.

FIG. 6 shows the eye diagram from the data received after 1.8 μs in FIG. 5, where the curve 602 is for the transmitted data and the curve 601 is for the recovered data.

FIG. 7 shows the eye diagram from data received after 1.8 μs in a similar simulation where the channel is not bandwidth limited. The curve 702 is for the transmitted data and the curve 701 is for the recovered data.

It is noted that the transmitted data has non-zero jitter and at least therefore the recovered data also has non-zero jitter. The added jitter, which may be seen as a quality parameter for the receiver, appears to be small relative to the total jitter.

In the foregoing the invention has been discussed in regard to a binary signal. However, in one embodiment it is within the scope of the invention to track the correct threshold for a signal having more than two levels such as three or four or more. For such as signal it is for example equivalent to the discussed method to determine lowest and highest values of the signal and determine the intermediary thresholds using that the extinction ratios between the signals are substantially constant. In the event that an intermediary value is transmitted for an extended time period the receiver may recognize this by taking into account the value from an activity detector, the average signal, the previous thresholds and/or high, low or intermediary values. In the event of low activity and an average value in the vicinity of a previous intermediary value (such as between previously set threshold) the receiver may be arranged to recognize that the average is a constant intermediary value and set the thresholds according to the previous extinction ratios.

The invention claimed is:

1. A method for setting a logic threshold in an optical receiver suitable for detecting a binary optical data signal, said method comprising:
   a. converting said binary optical data signal, via a photo detector, to a binary electrical signal that is proportional to said binary optical data signal,
   b. at a previous time said binary electrical signal comprising a previous logic high value ($P_H$) and a previous logic low value ($P_L$) in response to said binary optical data signal, said previous $P_H$ value and previous $P_L$ value having a previous extinction ratio,
   c. setting a previous logic threshold suitable for distinguishing logic values in said binary electrical signal, or a derivative thereof,
   d. at a later present time, said binary electrical signal comprising at least one of a present $P_H$ value and a present $P_L$ value in response to said binary optical data signal, said present high value and present low values having a present extinction ratio, wherein the previous extinction ratio and the present extinction ratio are substantially equal,
   e. measuring at least one of
      i. a previous $P_H$ value and a present $P_H$ value related to said previous and present high value, respectively, and
      ii. a previous $P_L$ value and a present $P_L$ value related to said previous and present low value, respectively,
   f. updating said previous logic threshold to a present logic threshold based on the at least one previous extinction ratio, and at least one of
      i. the measured previous and present $P_H$ value and
      ii. the measured previous and present $P_L$ value.

2. The method of claim 1 wherein said binary optical signal comprises a signal content having extensive periods of consecutive identical digits (CIDs).

3. The method of claim 1 comprising measuring said present $P_H$ and present $P_L$ and in the event that one of said measurements is deemed invalid setting a threshold based on the other value and that the previous and present extinction ratios are substantially equal.

4. The method of claim 3 wherein the present $P_H$ value is invalid in the event that the current signal over a time period longer than longer than or equal to $10^4$ bits adjacent to determining the present $P_H$ value has low values more than 50% of the time.

5. The method of claim 3 wherein the present $P_L$ value is invalid in the event that the current signal over a time period longer than longer than or equal to $10^4$ bits adjacent to determining the present $P_L$ value has low values more than 50% of the time.

6. The method claim 3 wherein a change in $P_L$ or $P_H$ relative to the other value or an average value related to the electrical binary signal indicates that said $P_L$ or $P_H$ is invalid.

7. The method claim 3 wherein a rate of change in $P_L$ or $P_H$ indicates that said $P_L$ or $P_H$ is invalid.

8. The method of claim 3 wherein the validity of said present $P_L$ or $P_H$ value is determined by a Threshold Adjustment Circuit (TAC) from one or more of the following parameters: the rate of chance in said $P_L$ or $P_H$, the relative change in said $P_L$ or $P_H$, the deviation between AVG and a threshold, one or more indicator values obtained via said activity detector, and the domination of the other value said $P_L$ or $P_H$ where $P_H$ and $P_L$.

9. The method of claim 8 wherein said indicator values obtained via said activity detector, optionally in combination with said AVG or said threshold, allow a Threshold Adjustment Circuit (TAC) to determine a state of the signal.

10. The method of claim 9 wherein said states comprise two or more of the following possibilities:
    a. High activity
    b. Medium activity
    c. Low activity.

11. The method of claim 10 where a state of high activity causes said TAC to perform at least one of the following
    a. determining the DC balance of the signal by determining a deviation between AVG and $TH_p$, and adding suitable offset values to $P_L$ and/or $P_H$ optionally depending on said deviation,
    b. setting the threshold according to the method applied during medium activity,
    c. maintaining constant value of said threshold.

12. The method of claim 10 where a state of medium or low activity causes said TAC to set the threshold by updating said previous threshold to a present threshold based on the previous and at least one of
    i. the measured previous and present $P_H$ value and
    ii. the measured previous and present $P_L$ value.

13. The method of claim 10 where in the event that the present $P_L$ and $P_H$ are both valid, the threshold is set based on $P_L$ and $P_H$.

14. The method of claim 1 wherein at least one of the values $P_L$ and $P_H$ is obtained via at least one peak detector.

15. The method of claim 14 where said peak detector comprises a difference amplifier with a bandwidth $BW_P$ having a cut off frequency corresponding to a time period of 2 bits or more.

16. The method claim 14 where said peak detector has a characteristic discharge time corresponding to a time span of $10^3$ bits or more.

17. The method of claim 1 wherein said at least one previous extinction ratio is a value proportional and/or offset from a parameter selected from the group of said previous logic threshold, said previous $P_H$, said previous $P_L$, the ratio of said previous $P_H$ to said previous $P_L$, or a combination thereof.

18. The method of claim 1 further comprising determining multiplication factors $N_H$ and $N_L$, forming at least part of the extinction ratios, so that each of said values $P_H$ and $P_L$ may be calculated as said multiplication factors $N_H$ and $N_L$ times a common factor $I_0$, so that $P_H \propto N_H \cdot I_0$ and $P_L \propto N_L \cdot I_0$.

19. The method of claim 18 where said threshold is set to a value based on $I_0 \cdot (N_H + N_L)/x$.

20. The method of claim 19 where x is substantially equal to 2.

21. The method of claim 18 further comprising applying previous values of $N_H$ and $N_L$ and determining $I_0$ from a valid present value of $P_H$ or $P_L$ using the relations $I_0 \propto P_H/N_H$ or $I_0 \propto P_L/N_L$, respectively.

22. The method of claim 1 comprising setting the extinction ratio E to $E_{div} \propto P_H/P_L$, where $P_H$ and $P_L$ are optionally adjusted for an offset relative to said binary electrical signal.

23. The method of claim 22 comprising setting the present threshold using a previous extinction ratio E and a valid value of the present $P_H$ or $P_L$ so that said present threshold is set to a value based on $P_H*(1+1/E)/x$ or $P_L*(1+E)/x$, where $P_H$ and $P_L$ are optionally adjusted for an offset relative to said binary electrical signal.

24. The method of claim 23 where x is substantially equal to 2.

25. The method of claim 1 comprising setting the present threshold based on the relative change from the previous to the present value of said at least one measured previous $P_H$ value and present $P_H$ or previous $P_L$ value and present $P_L$ where $P_H$ or $P_L$ is optionally adjusted for an offset relative to said binary electrical signal.

26. The method of claim 18 comprising updating said previous threshold to a present threshold by adjusting said previous threshold by substantially the same relative change.

27. The method of claim 1 further comprising determining an average (AVG) of the electrical signal.

28. The method of claim 27 wherein a threshold determined using either said $P_L$ or $P_H$ and at least one previous extinction ratio parameter E is compared to the average of the electrical signal to determine the validity of $P_L$ or $P_H$.

29. The method of claim 28 where a substantial deviation between AVG and a threshold $TH_P$ indicates that either $P_L$ or $P_H$ is invalid, so that
  a. when $AVG > TH_P$ then $P_L$ is deemed invalid and
  b. when $AVG < TH_P$ then $P_H$ is deemed invalid.

30. The method of claim 29 where a substantial deviation calculated as a $$100\% \cdot \left| 2 \frac{AVG - TH_P}{P_H - P_L} \right|$$

is larger than or equal to 5%%.

31. The method of claim 1 further comprising applying an activity detector to indicate the activity in the electrical signal to obtain an indicator value for one or more of the following:
  a. a number of transitions between logic high and logic low within a predetermined time period, and
  b. a number of incidences of CIDs of logic high and/or logic low value longer than a predetermined length over a predetermined time period.

32. The method of claim 1 wherein said previous threshold is updated by adjusting one or more of
  a. a shunt current source suitable for shunting part of the current from the photo detector,
  b. an offset for an amplifier, such as an amplifier converting a current from the photo detector to a voltage, and
  c. the threshold for a decision circuit, such as a limiting amplifier.

33. The method of claim 1 wherein a threshold is compared to the average of the electrical signal to determine the validity of $P_L$ or $P_H$ such as a threshold calculated as $(P_L + P_H)/x$, where $P_H$ and $P_L$ are optionally adjusted for an offset relative to said binary electrical signal.

34. The method of claim 33 where x is substantially equal to 2.

35. An optical receiver for receiving a binary optical data signal comprising
  a. a photo detector arranged to produce an electrical signal proportional to said optical signal, said electrical signal having a present high value and a present low value forming a present extinction ratio, and a previous high value and a previous low value forming a previous extinction ratio
  b. at least one peak detector arranged to detect a $P_H$ value related to said high value and at least one peak detector arranged to detect a $P_L$ value related to said low value,
  wherein the receiver further comprises circuitry programmed to perform the method of claim 1.

36. The optical receiver of claim 35 further comprising an averaging circuit suitable for providing a parameter AVG.

37. The optical receiver of claim 35 comprising an activity detector suitable for determining the activity of the binary electrical signal or binary optical data signal.

38. An optical receiver chip for receiving a binary optical data signal comprising
  a. circuitry suitable receiving a binary electrical signal from a photo detector, said electrical signal having a present high value and a present low value forming a present extinction ratio, and a previous high value and a previous low value forming a previous extinction ratio,
  b. at least one peak detector arranged to detect a $P_H$ value related to said high value and at least one peak detector arranged to detect a $P_L$ value related to said low value,
  wherein the receiver chip further comprises circuitry programmed to perform the method of claim 1.

39. The method of claim 1 wherein said binary optical signal carries an unencoded signal content.

40. A method for setting a threshold in an optical receiver comprising a threshold adjustment circuit (TAC), said method comprising:
  a. converting a binary optical data signal to a binary electrical signal proportional to said binary optical data signal via a photo detector, said binary electrical signal having a present high value and a present low value forming a present extinction ratio, and a previous high value and a previous low value and a previous extinction ratio,
  b. obtaining a previous logic high value ($P_H$) and a present logic high value ($P_H$) related to said previous and present high value, respectively,
  c. obtaining a previous logic low value ($P_L$) and a present logic low value related to said previous and present low value, respectively,
  d. forming at least one previous extinction ratio which is substantially equal to a present extinction ratio,
  e. validating said present $P_H$ and present $P_L$, and
  in the event that one of values of said present $P_H$ and present $P_L$ is deemed invalid, setting a threshold via said TAC for said binary electrical signal based on the other value and said at least one previous extinction ratio.

* * * * *